J. W. STEPHENSON.
JOURNAL BOX.
APPLICATION FILED AUG. 7, 1911.

1,025,888.

Patented May 7, 1912.

WITNESSES
R A Balderson
W Famaries

INVENTOR
Jno. W. Stephenson,
by Bakewell, Byrnes, Parmelee,
Attys

UNITED STATES PATENT OFFICE.

JOHN W. STEPHENSON, OF TOLEDO, OHIO, ASSIGNOR TO THE NATIONAL MALLEABLE CASTINGS COMPANY, OF CLEVELAND, OHIO, A CORPORATION OF OHIO.

JOURNAL-BOX.

1,025,888.

Specification of Letters Patent.

Patented May 7, 1912.

Application filed August 7, 1911. Serial No. 642,666.

*To all whom it may concern:*

Be it known that I, JOHN W. STEPHENSON, of Toledo, Lucas county, Ohio, have invented a new and useful Improvement in Journal-Boxes, of which the following is a full, clear, and exact description, reference being had to the accompanying drawings, forming part of this specification, in which—

Figure 1:
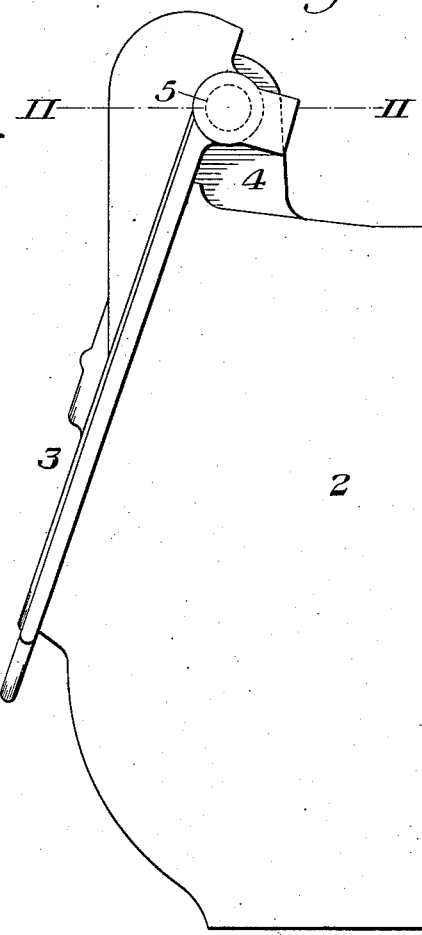
Figure 2:
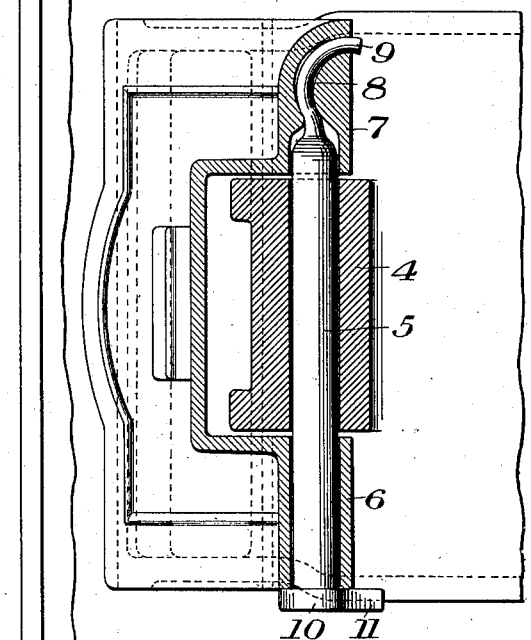
Figure 3:
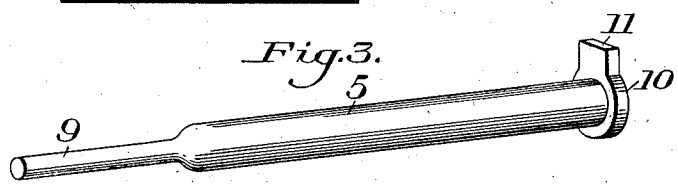
Figure 4:

Figure 1 is a side elevation of a journal box embodying my improvement; Fig. 2 is a detail sectional view on the line II—II of Fig. 1; Fig. 3 is a detail view of the pin; and Fig. 4 is a view similar to Fig. 3 but showing a modified form of pin.

My invention has relation to journal boxes, and more particularly to the manner of securing the hinged or pivoted lid to the body of the box.

My invention is designed to provide a pin or pintle for the lid, having means whereby as it is inserted into its bearing or bearings on the box and engaged with the lid, it is, by the same act caused to be secured in place in such a manner that it cannot accidentally work loose and fall out.

To this end my invention consists in a journal box pin or pintle having a bendable end portion, together with means carried by the box or cover for receiving and bending or deflecting said end portion when the pin is inserted therein.

Referring to the accompanying drawings, the numeral 2 designates the body of the box, 3 the lid or cover. These parts may be of any usual or suitable form.

4 designates a bearing lug on the box, having an aperture therethrough for the pin or pintle 5. The cover 3 is formed with the apertured bearing portions 6 and 7 to receive the end portions of the pin or pintle. The aperture 8 in the portion 7 is of curved form, such as indicated in Fig. 2; and the pin or pintle has a reduced bendable end portion 9. As the pin or pintle is inserted and driven into this opening, its end portion is bent or deflected as shown in Fig. 2, thereby forming a secure clench lock which will effectually prevent the pin from working loose. The bendable end portion of the pin may be either round, as shown in Fig. 3, or flat, as shown in Fig. 4. Its head 10 is preferably provided with a driving lug or projection 11. If it should be necessary to remove the pin or pintle this can be readily done by driving outwardly on said projection.

It will be readily understood that my improvement is adaptable to journal boxes and lids of various forms, and that it forms an extremely simple and secure means of securing the pin or pintle against working out.

What I claim is:—

1. A journal box pin or pintle having a reduced bendable end portion; and the lid having means to engage the pin or pintle as it is seated and thereby bend or deflect its bendable end portion, substantiall as described.

2. The combination with a journal box and its lid, of a pin or pintle forming the connection between the said parts, said pin or pintle having a bendable portion, and means carried by the box in fixed relation to the pin or pintle seat for engaging and bending said portion by and during the act of seating the pin; substantially as described.

3. The combination with a journal box and its lid, of a pin or pintle forming a connection between said parts, the pin or pintle having a bendable end portion, and the lid having a deflecting opening to receive said end portion; substantially as described.

In testimony whereof, I have hereunto set my hand.

JOHN W. STEPHENSON.

Witnesses:
JOHN J. MANNING,
N. B. MACKENZIE.

Copies of this patent may be obtained for five cents each, by addressing the "Commissioner of Patents, Washington, D. C."